April 23, 1940.   W. E. WOODARD   2,198,429
DIRECT INDICATING LOCOMOTIVE REVERSE GEAR
Filed Nov. 16, 1936   4 Sheets-Sheet 1

INVENTOR
William E. Woodard
BY
Synnestvedt + Lechner
ATTORNEYS

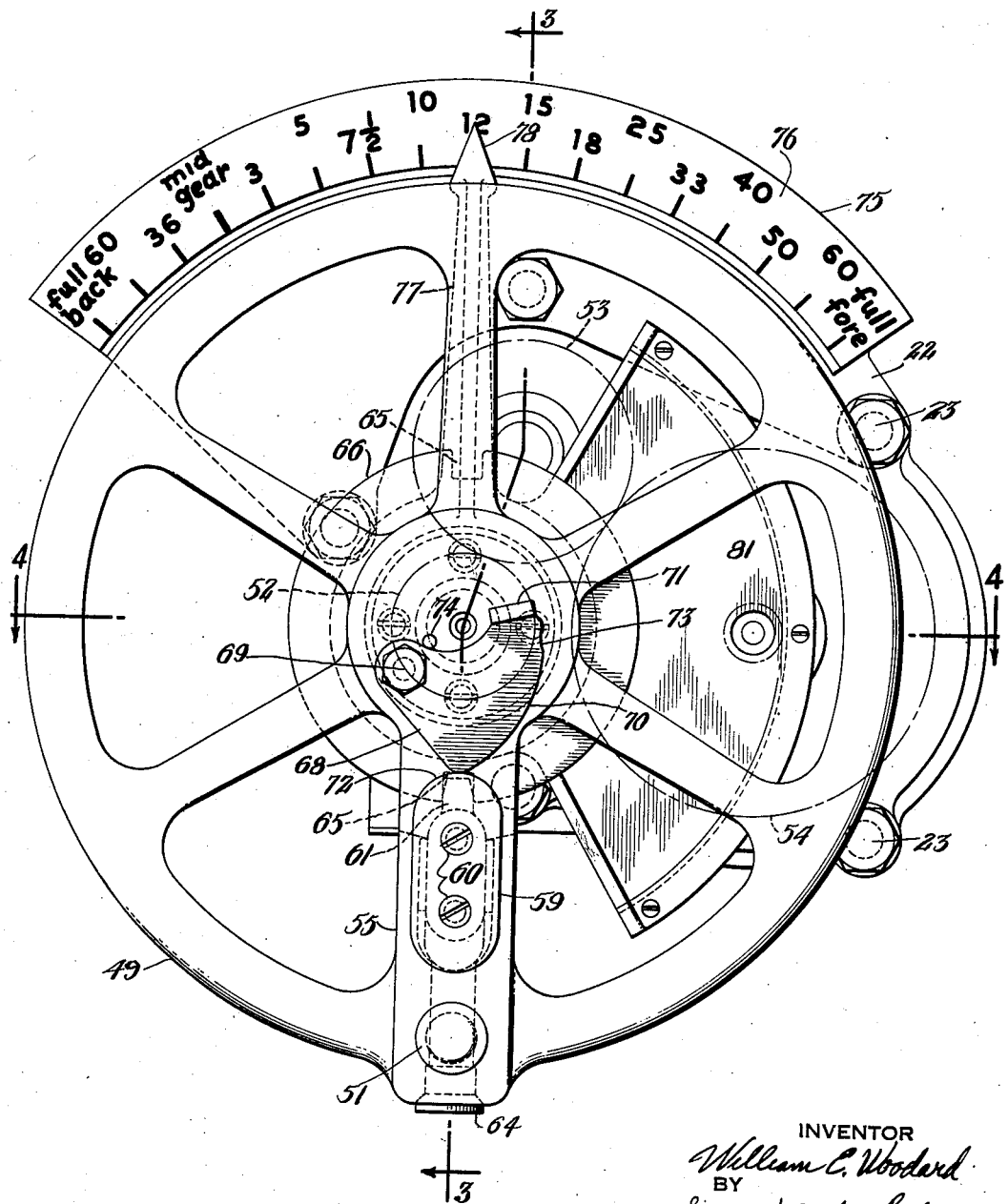

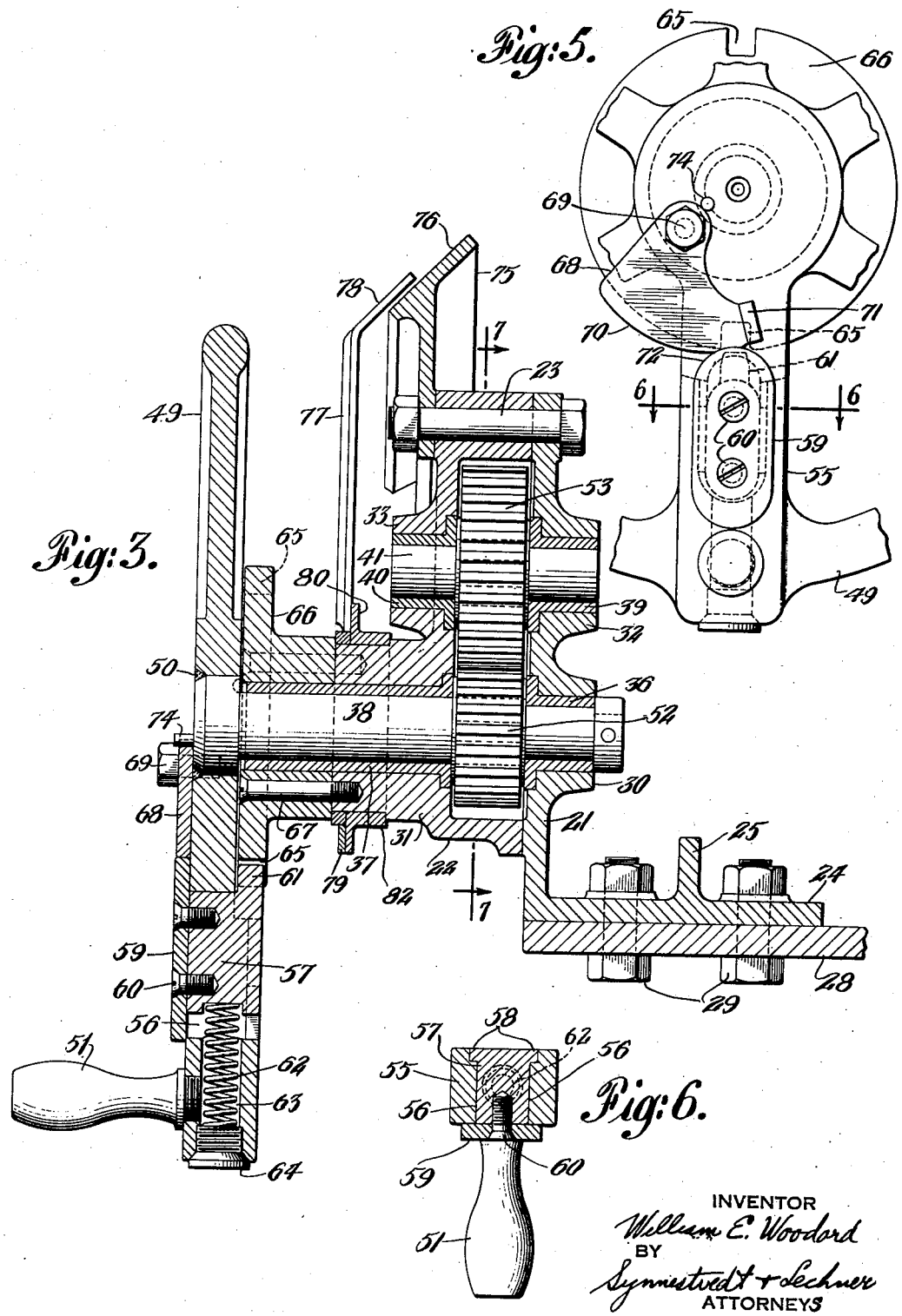

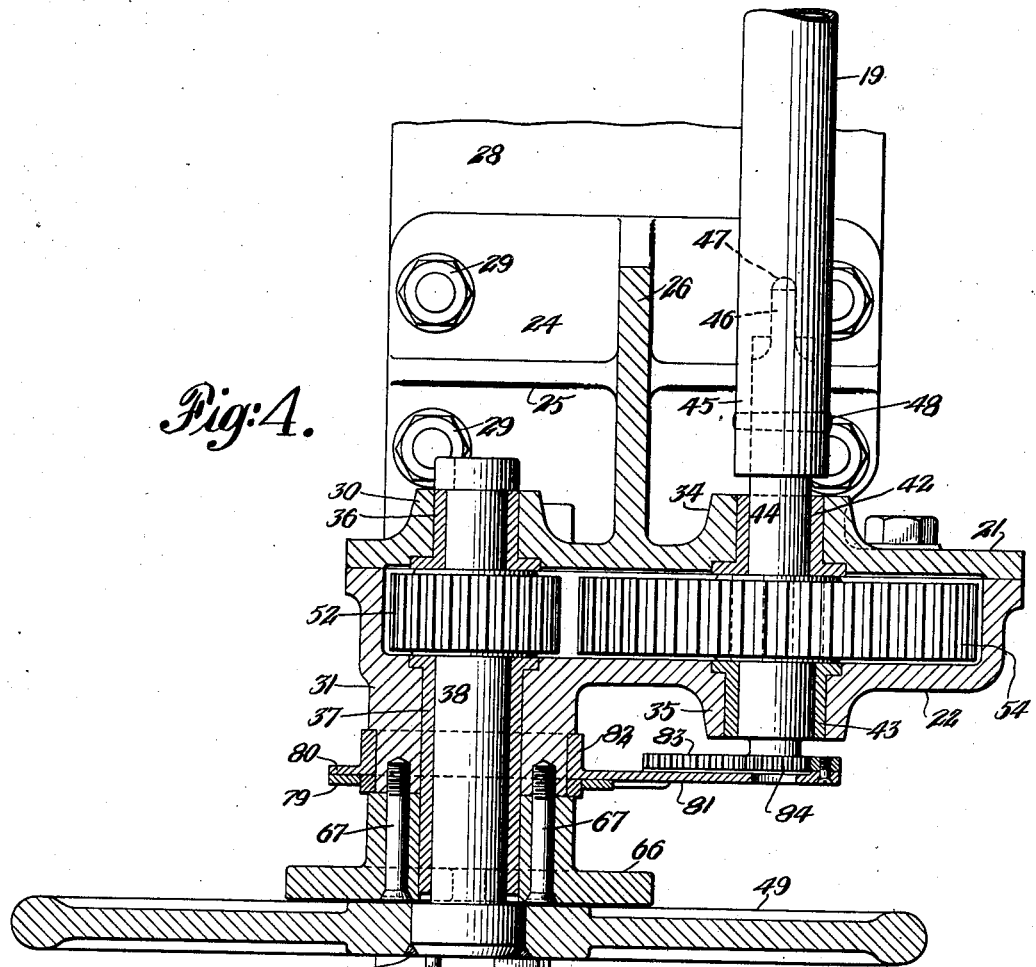

Patented Apr. 23, 1940

2,198,429

UNITED STATES PATENT OFFICE 2,198,429

DIRECT INDICATING LOCOMOTIVE REVERSE GEAR

William E. Woodard, Forest Hills, N. Y.

Application November 16, 1936, Serial No. 110,954

10 Claims. (Cl. 116—124)

This invention relates to locomotive reverse gear mechanism or the like, and particularly to the direct-indicating type, being especially adapted to reverse gears in which the manually operated element is mounted for rotative movement.

Among the primary objects of the invention are: to lighten the weight of the reverse gear mechanism; to render more compact such parts thereof as are mounted in the cab of the locomotive, so as to save space; to render the mechanism easy and convenient to operate; and to provide a readily readable indication of the cut-off adjustment.

The invention further contemplates improvements in the arrangement of the reduction gearing between the manually operated reverse wheel in the cab and the valve reversing shaft which extends forwardly to the valve gear of the locomotive engine; improvements in the construction, operation and readability of the cut-off indicating portion of the mechanism; improvement of the reverse gear latch mechanism; and in general a coordination of the hand wheel, the indicator, and the reduction mechanism, as well as the mounting of the same in a frame or casing and a location thereof in the cab, in such manner that the gear is easy to operate and easy to read, directly in terms of valve cut-off, is readily coupled up to the valve gear, and is conveniently mounted on the back-head of the boiler.

Still more specifically, the invention contemplates a manually operated reverse gear provided with a reverse gear hand wheel rotatable in a plane substantially perpendicular to the forwardly extending reverse shaft, reduction gearing, i. e., power multiplying gearing, interconnecting said wheel and shaft and located in a plane paralleling that of the wheel, indicator mechanism lying also in a plane parallel with the plane of rotation of said wheel and including an arcuate scale or dial with indicia giving the valve cut-off directly in terms of percentage of piston stroke, by cooperation with a movable indicating hand or pointer which is mounted concentric with the reverse wheel shaft and is actuated through an operative connection with the reverse gear shaft, and enclosure of the gearing and shaft bearings in a compact, rigid protective casing which serves also as a frame for said parts and a means of mounting the reverse gear mechanism on a suitable support in the cab.

While in the embodiment herein shown and described the improvements of the present invention are applied for direct manual operation of the reversal and cut-off adjustment of a locomotive poppet valve mechanism, it should be understood that the present improvements may also be applied for actuation of the valves by, or through the intermediation of, a servo-motor and/or for the actuation of piston valves, slide valves, or other types of valves or the like.

How the aforementioned objects and advantages, together with such others as may be incident to the invention are obtained, will be evident from the following description, taken together with the accompanying drawings.

Figure 1 of the drawings is a side elevational view of a locomotive of the poppet valve type, with certain parts omitted, showing the application of my improved reverse gear;

Figure 2 is a rear face view of the reverse gear mechanism, substantially as it would be seen from the engineer's position in the cab of the locomotive;

Figure 3 is a vertical longitudinal section through the mechanism of Figure 2, taken substantially on the line 3—3 of Figure 2, and fragmentarily showing a bracket for mounting the same in the cab, for example upon the backhead of the boiler;

Figure 4 is a horizontal section taken on the line 4—4 of Figure 2;

Figure 5 is a fragmentary view of a part of the hand wheel of Figure 2, illustrating portions of the wheel latch or locking mechanism in a different position;

Figure 6 is a detail of the latch mechanism, taken in section on the line 6—6 of Figure 5;

Figure 8 is a detail view of a portion of the indicator hand and its associated actuating mechanism.

Figure 1:
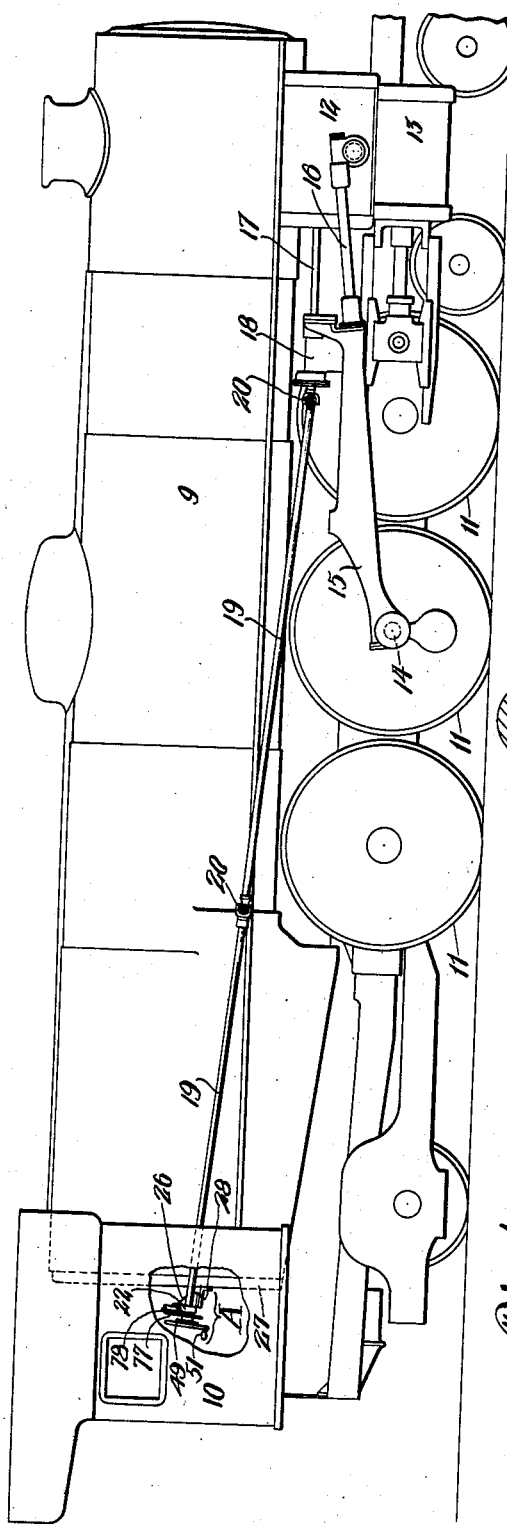
Figure 7:
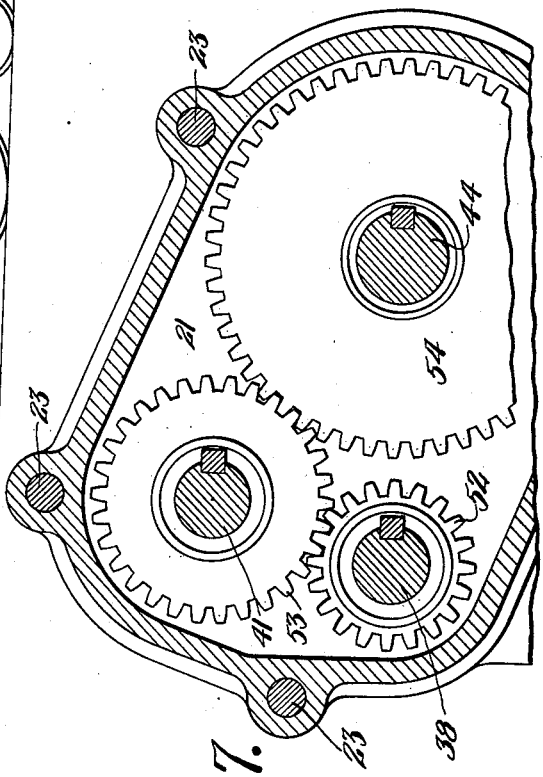
Figure 7 is a fragmentary section through the casing of the mechanism, taken on the line 7—7 of Figure 3, and showing the reducing gearing, i. e. power-amplifying gears, in elevation.

By reference now to Figure 1 it will be seen that the locomotive 9, having cab 10, driving wheels 11, valve chests 12 and cylinders 13, are provided, for example at the main crank pin, with a valve actuating shaft or pin 14 which is centered on the axle center and supported in a fixed casing 15. Shaft 14 is driven by the wheel through the intermediation of a return crank and a flexible coupling, and is geared to drive a shaft 16 located in said casing and extending forwardly to the valve chest where it actuates a rotating cam shaft for operating the poppet valves in said chest in accordance with known practice.

For the adjustment of the cut-off and reversal of the valves there is provided at each side of the locomotive a shaft 17 (only one of which is here shown) which extends from the gear box 18 to the respective valve chest 12, there being a cross connection between the right-hand gear box (shown) and the left-hand gear box (not shown) in accordance with known construction. Actuation of the valve adjusting mechanism just described is accomplished by my improved mechanism in the cab, designated by the letter A, through the reverse gear shaft 19 which may have incorporated therein suitable universal joints 20. The reverse shaft 19 could, however, be coupled up to a servo-motor or power reverse gear, this being more customary, however, in locomotives employing piston or slide valves.

Turning now to the detailed figures, it will be seen that the reverse gear case of my improved mechanism is little more than a frame composed of a main member 21 and a cover member 22 secured thereto as by bolts 23, such frame or casing serving to mount the bearings and house the shafts and gearing of the mechanism; the casing member 21 further having an integral base or flange member 24, stiffened by crossed webs 25 and 26, and adapted for mounting in the cab, as upon the backhead 27 of the boiler, by means of a bracket 28 and bolts 29. The two casing members are provided with bosses 30 and 31, 32 and 33, and 34 and 35, to receive and support the bearings 36, 37 of the hand wheel or primary shaft 38; 39, 40 of the intermediate shaft 41; and 42, 43 of the extension 44 of the reverse shaft 19, said extension or stub shaft 44 being removably coupled to the main reverse shaft 19 by slidably fitting in the socket 45 of the latter and by having a flat-sided tongue 46 engaged in a complementary recess 47. Relative angular adjustment between the axis of shaft member 44 of the reverse mechanism in the cab and the axis of the valve gear shaft 17 at the front end of the locomotive is taken care of by the universal joints 20 (shown in Figure 1), and initial relative longitudinal adjustment between the shaft member 44 and the reverse shaft 19, for purposes of installation, is accomplished by the sliding engagement of the parts 46, 47. This position may finally be fixed, if desired, by inserting a pin or key 48 extending through shaft member 44 and the socket portion 45 of shaft 19.

The hand wheel 49 is mounted fixedly upon the shaft 38, as by being welded thereon at 50. Rotation of this wheel, by means of the hand grip or crank 51 is imparted to the main reverse shaft 19 by means of gear 52 fixed on shaft 38, gear 53 fixed on the intermediate shaft 41 and meshing with gear 52, and gear 54 which is fixed on shaft 44 and meshes with the intermediate gear 53. These gears lie in a plane parallel with the plane of the hand wheel 49 so that the mounting of the gears and shafts and the coupling of the mechanism to the main reverse shaft 19 are accomplished in an extremely simple manner, while yet obtaining the necessary gear reduction. While the amount of gear reduction can, of course, be varied to suit the requirements as to mechanical advantage and the fineness of cut-off adjustment desired for given angular rotation of the wheel 49, I have in the present instance provided such a reduction that the shaft 19 is turned two-fifths of a revolution for each complete revolution of the wheel 49.

Turning now to the wheel latch mechanism, it will be seen that one spoke 55 of the wheel is enlarged and formed with a radial guideway 56 to slidably receive the latch member 57 which is held in position in the guide by means of the flanges 58 and the front plate 59 which latter is secured to the latch as by studs or screws 60. The latch member 57 carries a latch point or tongue 61 which, under the pressure of the coil spring 62 (secured in the bore 63 of spoke 55 by means of plug 64), is urged radially inwardly for engagement with one of the notches 65 provided in the periphery of the latch plate or disk 66, the latter being fixedly secured to the casing boss 31 by means of studs or screws 67.

A releasable latch lock, or latch operating cam 68 is pivoted on the hub of the wheel by a stud 69. The curved cam face 70 of the latch lock is struck on an arc eccentric with respect to the pivot pin 69 so that, upon movement of the releasable lock by means of the projecting flange or handle 71 the said cam surface 70 cooperates with the curved surface 72 of latch part 59 in a way to permit engagement of the latch in the position shown in Figures 2 and 3, and to effect release or disengagement of the latch in the position shown in Figure 5, a suitable notch 73 being provided in the operating face of the member 68 for retaining the parts in latch-disengaged position, and any suitable stop such as a pin 74 being provided on the hub of the hand wheel to stop the movement of the member 68 at the position of latch engagement.

The reverse gear mechanism is made directly readable in terms of valve cut-off by the parts now to be described. As best seen in Figure 2, an arcuate scale member 75, positioned in a plane parallel to the plane of the hand wheel and located just above the rim thereof with a bevelled or inclined indicating face 76, is secured to the casing member 22 by certain of the casing bolts 23; the indicator scale or dial being thus in the most convenient position for reading by the engineer. The indicia placed upon the scale preferably includes, in addition to full-forward valve gear position, full-back or reverse position, and mid-gear or neutral position, a series of intermediate marks or graduations identified by numerals which read in terms of percentage of the piston stroke at which the valve gear has been set for valve cut-off. It will be noted that in this instance the range of the scale devoted to forward operation is substantially larger than that devoted to reverse operation and that the step-by-step indications, though regularly spaced, are representative of varying percentages of cut-off. This is, of course, due to the construction of the valve gear mechanism itself, at the valve chests, which forms no part of the present invention per se. This arrangement is, however, desirable, as it provides a relatively fine gradation of cut-off and of cut-off indications in the forward range where fine valve cut-off adjustments are ordinarily desired, in locomotive practice.

The indicating hand 77, having an inclined tip or pointer 78 closely associated with the dial face 76, is mounted by an annular member 79 upon the annular portion 80 of a segment plate 81 which has a collar or flange 82 rotatably journalled upon the casing boss 31 for movement about the same center as is the hand wheel 49. Segmental plate 81 carries at its rim an internal gear 83 which is in mesh with a small pinion 84 fixed on the protruding end of the shaft member 44. As in the case of the main gearing, the ratio between the indicator pinion 84 and the segmental gear 83 may be different in different installations, but in the embodiment shown this ratio is such that approximately three and one-third turns of the reverse shaft 19 (being the full range of movement of the valve gear adjustment) effect a movement of the indicator hand from one end of the scale to the other. The entire gear reduction between the hand wheel and the indicator hand is thus such that eight complete revolutions of the hand wheel produce an approximately 90° range of movement of the indicator hand; and as there are two latch notches 65, for each revolution of the wheel there are seventeen positions of fixed adjustment which can be made, and the scale is therefore marked off into seventeen divisions for this particular installation, which it may be reiterated is only by way of example and not by way of limitation.

From the foregoing detailed description it will now be quite clear that a typical operation of the mechanism will be as follows: assuming that the valve gear is in neutral or mid-position, the engineer, for a forward movement of the locomotive, presses down on the latch release handle 71 (seen in Figure 2) until notch 73 engages curved surface 72 whereupon the latch is in the disengaged position (as shown in Figure 5). He then turns the wheel in the appropriate direction—the direction being determined by the design of the valve gear to which the shaft 19 is coupled—until, for example, the pointer 73 is at the extreme right of the scale 76. After the throttle is opened and the locomotive gains speed, the wheel is turned in the opposite direction until the pointer indicates a reduced cut-off suitable for the conditions of speed, load, and grade, whereupon the latch handle 71 is raised and the latch 61 engages notch 65 as shown in Figure 2. For each half turn of the hand wheel 49 the pointer will move to the next adjacent indicated cut-off and the latch point 61 will be in position to engage one or the other of the latch notches 65.

Whether the locomotive is equipped with a back-pressure gauge or speed indicator or other device directing the engineer what cut-off he should use at any given moment, or whether the locomotive is not so equipped and the engineer chooses his cut-off according to his own judgment as dictated by experience, he can in either event accurately adjust the reverse gear to the chosen cut-off, which by the present mechanism is clearly indicated and readily visible to the engineer from his normal position when working the reverse gear wheel.

The restriction of the scale range to about one-quarter of a circle, the location of it at the top quadrant of the movement of the wheel, and the bevel or inclination of the scale plate, aid in making the indicator easily read. Even in nighttime operation the indicator is readily readable, since although the locomotive cab lighting is customarily of a subdued nature so as not to interfere with the enginemen's vision of the signals, such lamps as are employed are usually located above the engineer's position where some light will be thrown upon the inclined scale face.

The spur reduction gearing and the latching arrangement are advantageous as compared with reverse wheel mechanisms heretofore employed in which the wheel actuates the reverse gear through a worm, since this improved reverse gear can be turned through its entire range more quickly than the worm-drive type and yet its fixity of adjustment in any position is assured by the latch device.

The advantages of the mechanism as to compactness, saving of space and weight, simplicity, ruggedness, ease of assembly and installation, etc., will also be readily apparent, without further description. As hereinbefore indicated, the mechanism is adaptable to either manual or power operation, and if desired the power mechanism might be applied either to the primary actuating shaft 38 or to the reverse shaft 19, or in other suitable ways. All of the advantages aforementioned, together with others which may occur to those skilled in the art, may be obtained with various structural modifications and changes of detail, without departing from the spirit and scope of the invention.

I claim:

1. In a locomotive reverse gear or the like, a rotatable hand wheel, a reverse shaft, gearing interconnecting said wheel and shaft, a casing enclosing said gearing, cooperating relatively releasable latch elements mounted respectively on said wheel and the face of said casing, and cut-off indicating mechanism comprising a member mounted on said casing and a member movable in juxtaposition thereto and operatively coupled with the reverse gear, the cooperating latch elements and the said indicating mechanism operating in parallel planes intermediate the plane of the wheel and the plane of the casing.

2. In a locomotive reverse gear or the like, a rotatable hand wheel, a reverse shaft, gearing interconnecting said wheel and shaft, a casing enclosing said gearing, cooperating relatively releasable latch elements mounted respectively on said wheel and the face of said casing, and cut-off indicating mechanism comprising a member mounted on said casing and a member movable in juxtaposition thereto about an axis coinciding with the axis of rotation of the wheel and operatively coupled with the reverse gear.

3. In a locomotive reverse gear or the like, a movable reverse shaft, a rotatable primary shaft with means coupling it to the reverse shaft to actuate the same, a fixed casing enclosing said coupling means and supporting said shafts, said reverse shaft extending out through opposite walls of said casing, a rotationally movable cut-off indicator member actuated upon rotation of the primary shaft and mounted co-axial therewith exteriorly of said casing, and reduction gearing between a projecting end of the reverse shaft and the said indicator member whereby the complete angular range of movement of the indicator member is a fraction of that of the said primary shaft.

4. In a locomotive reverse gear or the like, a movable reverse shaft, a rotatable hand wheel coupled therewith to actuate the same, a rotationally movable cut-off indicator actuated from said reverse shaft, and reduction gearing between the hand wheel and reverse shaft whereby the complete angular range of movement of the indicator is a fraction of that of the hand wheel, said indicator including an arcuate scale which is located adjacent the top of the hand wheel concentric therewith, the face of said scale sloping upwardly and forwardly with respect to the plane of said wheel.

5. In a locomotive reverse gear mechanism or the like, a rotatable hand wheel shaft, a rotatable reverse gear shaft, a rotatable collar carrying a cut-off indicator, means drivingly interconnecting said shafts and said collar in ratios such that the reverse gear shaft has a lesser angular movement than the hand wheel shaft and a greater angular movement than the indicator collar, together with an arcuate indicator scale extending peripherally of the hand wheel, and an indicator arm mounted on said indicator collar to move in a path adjacent said scale, said scale being positioned adjacent the top of said wheel and inclined or bevelled upwardly and away from the plane thereof.

6. In a locomotive reverse gear or the like, a rotatable hand wheel and shaft, a reversing shaft in spaced parallelism with the first mentioned shaft, a gear train interconnecting said two shafts and located adjacent the front face of the hand wheel in a plane parallel thereto, a casing enclosing said gearing, cooperating relatively releasable latch elements mounted respectively at the adjacent faces of said wheel and said casing, one of said latch elements being mounted for movement in a plane substantially parallel with the plane of said wheel, and means mounted on the rear face of said wheel and connected to operate the latch from that position.

7. In a locomotive reverse gear or the like, a rotatable hand wheel and shaft, a reversing shaft in spaced parallelism with the first mentioned shaft, a gear train interconnecting said two shafts and located adjacent the front face of the hand wheel in a plane parallel thereto, a rotatable indicator member mounted coaxial with the first mentioned shaft and rotatable relative thereto with reduction gearing for actuating the same, and a cooperating fixed indicator member positioned slightly outside the periphery of the hand wheel, said rotatable indicator member being located in a plane intermediate the plane of the wheel and the plane of said gear train.

8. In a locomotive reverse gear or the like, a rotatable main reverse shaft adapted to engage a connection from the locomotive valve gear, a rotatable primary actuating shaft, said two shafts being in offset parallel relationship, reduction gearing driving said main reverse shaft from said primary shaft, a cut-off indicator mounted coaxial with said primary shaft and rotatable relative thereto, and reduction gearing actuating said indicator from said main reverse shaft, together with an indicator scale member mounted in fixed relation to said gearing and cooperating with said cut-off indicator to give a visible indication of cut-off adjustment.

9. A locomotive reverse gear operating and indicating device, constructed as a separately applicable unit adapted for mounting upon a bracket in the cab and for operative association with a rotative reversing rod extending into the cab, comprising a base member providing means of attachment to a complementary bracket, a fixed casing rigid with said base member and having front and rear walls, a rotatable primary actuating shaft journaled in said walls, a rotative reverse shaft journaled in said walls and extending through the front wall and there providing means for connection to a complementary reversing rod and extending also through said rear wall of the casing, gearing enclosed within said casing and inter-connecting said shafts, and indicating mechanism including an indicator member located at the outer face of said rear casing wall and rotatable about the axis of said primary shaft, and an external operating connection between the rearward extension of said reverse shaft and the said indicator member.

10. A locomotive reverse gear operating and indicating device, constructed as a separately applicable unit adapted for mounting upon a bracket in the cab and for operative association with a rotative reversing rod extending into the cab, comprising a base member providing means of attachment to a complementary bracket, a fixed casing rigid with said base member and having front and rear walls, a rotative primary actuating shaft journaled in said walls, a rotative reverse shaft journaled in said walls and extending through the front wall and there providing means for connection to a complementary reversing rod and extending also through said rear wall of the casing, gearing enclosed within said casing and inter-connecting said shafts, indicating mechanism including an indicator member located at the outer face of said rear casing wall and rotatable about the axis of said primary shaft, and an external operating connection between the rearward extension of said reverse shaft and the said indicator member, a hand wheel mounted upon the rear end of said primary shaft, a latch between said wheel and said casing, and means at the rear face of said wheel coupled to operate said latch.

WILLIAM E. WOODARD.